Patented Feb. 4, 1936

2,029,412

UNITED STATES PATENT OFFICE 2,029,412

MANUFACTURE OF ESTERS OF LEVULINIC ACID

Gerald J. Cox and Mary L. Dodds, Pittsburgh, Pa., assignors, by mesne assignments, to Niacet Chemicals Corporation, New York, N. Y., a corporation of New York No Drawing. Application December 19, 1934, Serial No. 758,267

3 Claims. (Cl. 260—106)

This invention relates to the manufacture of esters of levulinic acid and particularly to improvements whereby increased yields of these products can be obtained from crude materials. The only available methods of preparing esters of levulinic acid have depended heretofore upon the initial purification of the crude syrup of levulinic acid obtained from the treatment of various carbohydrates with mineral acids. Such initial purification has been accomplished by distillation of the crude syrup under reduced pressure. This procedure results in considerable losses due to the destruction of some of the acid and to the failure to recover all of the acid available because of the nature of contaminating materials which result from the destruction of the carbohydrate. Furthermore, it has been necessary in order to secure a practically colorless acid, to repeat the distillation and to subject it to several crystallizations which entail further losses. Consequently, the yield of pure levulinic acid obtainable from the crude materials is not more than 25% of the theoretical, where the crude syrup is prepared at atmospheric pressure, and not substantially more than 34% of the theoretical where higher pressures and temperatures are employed.

It is the object of the present invention to provide a method of manufacturing esters of levulinic acid which is simple and effective and which avoids the losses incident to the initial purification of the syrup, so that higher yields of the esters can be obtained.

Other objects and advantages of the invention will be understood upon reference to the following specification, in which we have described by way of example the preferred procedure.

In carrying out the invention, we first prepare a crude syrup of levulinic acid. This can be accomplished either at atmospheric pressure or in a suitable autoclave at higher pressures and temperatures. For example, the procedure at atmospheric pressure may be substantially as follows. To 6000 cc. of water in a 12 liter flask, we add 3000 grams of cane sugar and 1500 cc. of concentrated hydrochloric acid. The mixture is boiled in an oil bath with continuous stirring for 24 hours. The mixture is then filtered and washed, the residue averaging about 660 grams being discarded. The filtrate and washings are evaporated to a syrup weighing about 1400 to 1500 grams. The crude syrup of levulinic acid is utilized without purification in the preparation of esters.

Alternatively, an autoclave of about 2 gallon capacity is charged with 1800 grams of cane sugar, 3500 cc. of water and 885 cc. of concentrated hydrochloric acid. With steam pressure of about 75 pounds per square inch in the jacket of the autoclave, the mixture is heated for about one hour after a temperature of 120° has been reached. A maximum temperature of about 146° C. is attained. The mixture is thereafter filtered and washed, and the filtrate and washings are evaporated in vacuo to a syrup weighing about 650 to 750 grams. This crude syrup of levulinic acid is likewise available for the preparation of esters.

The method of preparing the crude syrup of levulinic acid forms no part of the invention, and the details of procedure may be modified as desired. Any practicable method of preparing the syrup may likewise be utilized.

The crude syrup of levulinic acid is utilized in accordance with our invention without initial purification in the preparation of esters. From such crude syrup, we have prepared esters of various alcohols including methyl, ethyl, n-propyl, isopropyl, 2-methylbutyl, isobutyl, sec-butyl, n-amyl, isoamyl, methylpropylcarbinol and diethylcarbinol. In each case we have secured yields of the pure ester substantially greater than the equivalent amount of pure free levulinic acid which can be obtained by distillation of the crude syrup, and consequently a higher yield of the pure ester than it is possible to obtain by esterifying purified levulinic acid. Thus, yields of from 29% to 40% of the theoretical of various esters of levulinic acid in a pure form may be prepared in accordance with the invention, although the yields of pure levulinic acid produced by distillation do not exceed 25% to 34% of the theoretical, depending upon whether the crude syrup is prepared at atmospheric pressure or at increased pressures and temperatures. In every instance, our yields are superior to those obtainable by distillation of the crude syrup where corresponding methods of preparing the syrup are employed.

As an example of the preparation of esters from the crude syrup of levulinic acid, it will suffice to give a single example, since the procedure is substantially the same in preparing esters of the various alcohols mentioned. To prepare 2-methylbutyl levulinate, the crude levulinic acid syrup is washed into a 2-necked 5 liter round bottom flask, with 2000 grams of 2-methylbutanol and 100 cc. of concentrated hydrochloric acid. The flask is equipped preferably with a motor stirrer and with a water separator in series with a reflux condenser. Esterification is effected by boiling over a free flame. When most of the water is separated, the mixture is cooled and the alcohol solution is decanted from the gummy residue. The heating is then continued until water separation is negligible. The alcohol is then distilled, and the ester is recovered by distillation in vacuo. The ester so obtained is yellowish in color and contains free acid. The acid can be removed readily by shaking the ester with an anhydrous sodium carbonate. Substantially all of the color is removed by adding an appropriate quantity of activated carbon ("Norit"). The yield from 300 grams of cane sugar originally treated at atmospheric pressure is approximately 1175 grams or 36% of the theoretical.

In the preparation in a similar manner of n-butyl levulinate, we have obtained from 1800 grams of sugar treated originally in an autoclave, 725 grams of the product. The yield in this case is 40%.

The method as hereinbefore indicated depends upon the esterification of crude levulinic acid, that is to say, the syrup obtained by decomposing a carbohydrate with a mineral acid without initial purification or attempt to remove impurities which are present in the syrup. The esterification of this crude syrup yields an ester which can be purified readily and without the losses which are incident to the initial purification of the syrup. A considerably higher yield is thus available. The commercial preparation of pure esters of levulinic acid becomes practicable because we avoid the losses which have heretofore attended the attempt to produce pure levulinic acid from the crude syrup.

Various changes may be made in the details of procedure without departing from the invention or sacrificing any of the advantages thereof.

We claim:

1. The method of preparing esters of levulinic acid which comprises esterifying without previous purification a syrup of levulinic acid obtained by decomposing carbohydrates with a mineral acid.

2. The method of preparing esters of levulinic acid which comprises esterifying without previous purification a syrup of levulinic acid obtained by decomposing carbohydrates with a mineral acid and separating water and alcohol from the ester.

3. The method of preparing esters of levulinic acid which comprises esterifying without previous purification a syrup of levulinic acid obtained by decomposing carbohydrates with a mineral acid, separating water and alcohol, and purifying the ester.

GERALD J. COX.
MARY L. DODDS.